United States Patent [19]
Kielsmeier et al.

[11] Patent Number: 4,997,670
[45] Date of Patent: * Mar. 5, 1991

[54] METHOD OF BAKING PIZZA FROM COATED FROZEN CHEESE GRANULES

[75] Inventors: Lester O. Kielsmeier, Lakewood; Richard L. Barz, Longmont; Wesley J. Allen, Littleton, all of Colo.

[73] Assignee: Leprino Foods Company, Denver, Colo.

[*] Notice: The portion of the term of this patent subsequent to Jun. 28, 2005 has been disclaimed.

[21] Appl. No.: 297,968

[22] Filed: Jan. 17, 1989

Related U.S. Application Data

[63] Continuation-in-part of Ser. No. 285,305, Dec. 15, 1988, Pat. No. 4,894,245, which is a continuation of Ser. No. 142,910, Jan. 12, 1988, abandoned, which is a continuation-in-part of Ser. No. 36,022, Apr. 8, 1987, Pat. No. 4,753,815.

[51] Int. Cl.$^5$ ............... A23C 19/14; A23L 1/035
[52] U.S. Cl. ................... 426/582; 426/293; 426/302; 426/305; 426/296; 426/524
[58] Field of Search ............... 426/582, 293, 302, 305, 426/296, 524

[56] References Cited

U.S. PATENT DOCUMENTS

| | | | |
|---|---|---|---|
| 3,184,318 | 5/1965 | McCadam | 426/582 |
| 4,416,904 | 11/1983 | Shannon | 426/582 |
| 4,588,612 | 5/1986 | Perkins et al. | 426/307 |
| 4,687,672 | 8/1987 | Vitkovsky | 426/518 |
| 4,753,815 | 6/1988 | Kielsmier | 426/582 |

FOREIGN PATENT DOCUMENTS

| | | |
|---|---|---|
| 561821 | 8/1984 | Australia . |
| 578432 | 9/1988 | Australia . |
| 2075326 | 11/1981 | United Kingdom . |

Primary Examiner—Donald E. Czaja
Assistant Examiner—Helen Pratt
Attorney, Agent, or Firm—Tilton, Fallon, Lungmus & Chestnut

[57] ABSTRACT

A method of baking pizzas is provided in which free-flowing cheese granules are applied as a topping. The outer surfaces of the granules are coated with an aqueous carrier containing a cheese modifier for promoting the melting and fusing of the granules during baking.

8 Claims, No Drawings

4,997,670

METHOD OF BAKING PIZZA FROM COATED FROZEN CHEESE GRANULES

RELATED APPLICATIONS

This application is a continuation-in-part of copending applications Ser. No. 285,305, filed Dec. 15, 1988, now U.S. Pat. No. 4,894,245, which was a continuation of Ser. No. 142,910, filed Jan. 12, 1988, now abandoned, which was a continuation-in-part of application Ser. No. 036,022, filed Apr. 8, 1987, now U.S. Pat. No. 4,753,815.

FIELD OF INVENTION

The field of this invention is the preparation and use of comminuted cheese on pizzas and other baked food products.

BACKGROUND OF INVENTION

In the United States, many retail operations engaged in preparation and baking of pizzas desire to use cheese in a comminuted form. Consequently, producers of mozzarella and other cheese used on pizzas shred or dice block cheese for delivery to the pizza restaurants. To provide improved storage and keeping qualities, comminuted cheese for use on pizzas can be frozen and delivered in frozen or semi-frozen condition. However, the cheese must at least be thawed to the extent that the shreds or granules can be separated. Moreover, further thawing is needed to improve functionality.

The use of comminuted cheese in frozen or partially frozen condition on pizzas frequently results in baked products showing excessive browning and blistering. Not only is this appearance unattractive to the consumer, but the flavor and eating quality can also be adversely affected.

The recommended practice involves slow thawing of the frozen cheese. Where thawing is carried out during non-freezing refrigerated storage, as is a common practice, a minimum of two to three days of thawing-holding is usually required. Moreover, the best practice involves holding of the granular cheese for four to five days, until thawing is completed.

Because of the problems associated with the use of frozen comminuted cheese for preparing pizza, certain franchised cheese restaurants require that the comminuted cheese be packaged non-frozen in specially designed packages. This adds considerably to packaging and distribution expenses, although it does avoid the necessity of slow thawing.

As far as is known, no one heretofore has produced frozen comminuted cheese which can be applied to pizzas in frozen or partially frozen condition and baked to produce a pizza product of as good quality as with fully thawed cheese. The high standards of appearance, quality and taste for large scale pizza preparation have not been satisfied by the use of comminuted cheese which has not been completely thawed.

It has also been desired to modify the properties of granular cheese for use on pizzas and as toppings or ingredients in other baked food products. Such modifications include the incorporation of emulsifiers and flavor additives. Heretofore, however, no method or product has been provided in which such additives are provided a components of frozen comminuted cheese.

SUMMARY OF INVENTION

The coated frozen cheese produced in accordance with this invention is in a particulate free-flowing condition. Modification of taste and functional properties of the cheese is obtained by applying coatings to the outsides of the cheese particles. The coatings can be applied so as to encapsulate the individual granules.

More specifically, it has been found that a new kind of frozen granular cheese product can be prepared by coating frozen free-flowing cheese granules with an aqueous carrier containing one or more cheese additives, such as flavor modifiers, emulsifiers, etc. The additive can be distributed in an aqueous carrier in the form of a solution, dispersion, or emulsion. The carrier containing the additive is applied as a thin coating to the granules. On contact with the granules, the coating freezes, thereby fixing the additive in distributed form around the outer surfaces of the granules.

The coated frozen granules have a variety of uses in addition to application to pizzas. They can be used as toppings or ingredients in other food products. By application in frozen or semi-frozen condition, the coatings remain distributed on the granules. When the food product is baked, the coatings will liquify and the additive will be spread over and into the cheese granules or into and through the food product. In other words, the desired modification occurs during baking use of the coated frozen granules. A method and product are thereby provided which achieve efficient and uniform modification of granular cheese for use in baked food products.

DETAILED DESCRIPTION

The term "comminuted cheese" as used herein refers to shredded or diced cheese of the kind which heretofore has been sold for use in producing pizza products. The term "granule" is used generically as referring to the particulate form of such shredded or diced cheese. The granules are usually of cubical or an elongated rectilinear shape. However, the granules may also be slivers of irregular shape.

In practicing the method of this invention, any cheese may be employed of the kind used on pizzas or in other baked food products. In the United States, varieties of mozzarella are the most common type cheese for pizza use, and are used alone or in cheese blends. The term "pizza cheese" usually refers to a semi-soft part skim milk cheese which is similar to but not the same as mozzarella. Other varieties of cheeses used on pizzas include cheddar, Muenster, Swiss, and Provolone. Such cheeses are usually produced in block form. For purpose of this invention, the cheese blocks are comminuted to shreds or granules. For example, the block cheese can be sliced and then diced to form cubical or elongated granules. Alternatively, cheese shredding equipment can be used. The granules may have dimensions in inches of from $0.1 \times 0.1 \times 0.5$ up to $0.25 \times 0.25 \times 1.5$. Examples of representative granule shapes are: (1) $\frac{1}{8} \times 3/16 \times \frac{3}{4}$ inches; and (2) $\frac{1}{8} \times \frac{1}{8} \times \frac{1}{8}$ inches.

In carrying out the method of this invention, the comminuted cheese can be rapidly frozen by direct contact with low temperature air. The freezing air is preferably at a temperature below $-10°$ F., such as below $-20°$ F. For example, an optimum air temperature can be as low as $-35°$ to $-45°$ F.

To accomplish rapid freezing of the comminuted cheese, a bed of the granules can be directly contacted by freezing air. For example, the cheese granules may be contacted in a fluidized bed, or in an agitated bed for rapidly exposing all exterior surfaces of the granules to the freezing air. By passing the freezing air upwardly through beds in which the cheese particles are agitated, or preferably fluidized, the air flow can contact all of the exterior surfaces of the particles. With air at a sufficiently low temperature, surface crusts will rapidly form on the granules, thereby locking in the moisture.

Similar results can be obtained with other methods of rapid freezing. For example, instead of contact with freezing air, the granules may be contacted with other fluid freezing agents, such as liquid carbon dioxide, liquid nitrogen, etc. Air freezing, however, is preferred.

Commercially available air freezing equipment can be used. This equipment is of the kind sold for individual quick freezing (IQF) of granular food products. Heretofore, "IQF" equipment has been employed primarily for freezing vegetables, and the freezing step has usually been accompanied by partial drying of the product. In preparing the frozen cheese for the purpose of this invention, as explained above, it is desirable to avoid moisture loss from the cheese as it is being frozen.

In one preferred method of freezing the comminuted cheese, fluidized bed-type IQF equipment is employed. Such fluidized bed equipment is described in U.S. Pat. Nos. 3,169,381, 4,265,096, and 4,478,141. Commercially, suitable IQF fluidized bed equipment is available from Frigoscandia (Frigoscandia Contracting, Inc., Bellevue, Wash.). Expanded bed-type freezing equipment is available from several suppliers, including Cloud & Britton, Inc., Mountlake Terrace, Wash.

In preparing the comminuted cheese for freezing, precooling of the cheese is not required, that is, the cheese may be at temperatures substantially above 32° F. For example, temperatures in the range of 35°-55° F. can be used, up to ambient room temperature. After the comminuted cheese is completely frozen, typically requiring from five to ten minutes, the cheese granules will be at very cold temperatures, but somewhat above the temperature of the freezing air. For example, the temperature of the frozen cheese will usually be below 0° F., such as at a temperature of from about −10° to −20° F.

After the cheese is frozen as described, the shreds or granules will be in an individual free-flowing form. The particulate cheese is then further processed in accordance with this invention. For example, a conveyor belt, or rotating drum, or other equipment may be used. In one embodiment, the cheese particles may be sprayed with an aqueous carrier containing one or more cheese additives, such as flavor modifiers or functional modifiers, including emsulifiers, surfactants, defoamers, preservatives, etc. Any GRAS-approved food additive can be used. The additive may be in an aqueous solution, dispersion, or emulsion, and a plurality of additives may be applied in a single layer or a plurality of layers. The carrier should contain sufficient water so that it will freeze on the cheese particles. Granules of different kinds of cheese may be mixed in frozen condition, either before or after coating.

It is desirable to mix or agitate the cheese while the coatings are being applied. When properly applied, the individual granules become encapsulated by the frozen coating. A conveyor belt can be equipped with devices for mixing the cheese particles as they are coated. Spray application of the coatings will usually be most convenient. As the aqueous carrier is distributed over the outer surfaces of the cheese granules, the carrier can be rapidly converted to frozen layers. At the same time, the coated granules can remain free-flowing.

In a preferred embodiment, the coatings are in the form of thin continuous layers and comprise from 0.5 to 4.0% by weight based on the uncoated cheese granules, that is, from 0.5 to 4 parts of the aqueous coating are used per 100 parts by weight of cheese. Although distribution of the coatings is enhanced because the aqueous carrier is not absorbed by the frozen granules. A series of coatings, such as a two-layer coating, may be applied, each layer containing one or more different additives.

The use of such frozen coatings can be in addition to application of a preservative or other agent to the granules before freezing, when immediate granule penetration is desired. For example, an aqueous solution of sodium citrate may be sprayed on the granules prior to freezing. Sodium citrate is a sequestrant which functions like phosphates to modify the functional properties of cheese. Such sequestrants attract cations in the cheese protein. The resulting modified protein structure has an improved melt characteristic, being more fluid, and resulting in a baked cheese which is more tender and has less stretch.

When the coated frozen cheese is applied to pizzas and baked thereon, the coatings will liquify first. This permits the flavor additive, and/or emulsifier or other functional modifier, to spread over and into the cheese particles as their outer surfaces become thawed and melted. The water in the coating will flash off. In this way, special flavor characteristics and/or functional characteristics can be imparted with relative uniformity to the melted cheese layer on the pizza. For example, cheese emulsifiers applied in this way can function to soften the outer portions of the cheese granules. This will improve melting and fusing of the granules. The emulsifier functions as a surface active agent. Surface active agents such as emulsifiers and defoamers reduce surface tension between the protein, fat, and water-phases of the cheese thereby changing its melt performance. With a coating containing a surface active agent, more oiling off will occur and less blistering will result, as the granules melt and fuse during baking.

These functionability features are also of importance in toppings for other baked food products. Further, the improved melting and flavor distribution are generally advantages where the frozen granules are mixed into food products prior to baking. Some of the advantages of the present invention can also be achieved in other uses of the coated frozen granules, such as in the home preparation of salads or salad dressings. Coated frozen granules may be mixed into a dressing or applied to a salad. They will rapidly thaw, and as they thaw the surface coating containing the flavor additive will become distributed and impart the desired flavor characteristics to the dressing, salad, etc.

The coated frozen granules may be packed in plastic bags and the bags placed in cartons for shipment or storage. In prior practice, frozen storage of granular cheese was limited to about six months without loss of quality. It is a significant improvement that the coated frozen cheese granules of this invention can be stored for periods of over 12 months without any quality deterioration. This storability feature facilitates production by the cheese manufacturer in the seasons of the year when milk is abundant. As stated above, to maintain the cheese in optimum condition, it has been found desirable to utilize successively higher ranges of storage temperatures. This avoids storage holding in which the granules are stored at a lower temperature than the initial frozen storage temperature.

When the coated frozen product reaches a retail pizza outlet, for example, it is not necessary to completely thaw the cheese prior to use. For example, the cheese may be taken directly from frozen storage and applied to pizzas just prior to baking. However, handling practices and available cheese storage facilities vary considerably. Some restaurants may not be equipped for frozen storage, and/or the cheese may have been permitted to become partially thawed before it reaches the restaurant. These differences are not matters for concern when employing the frozen comminuted cheese of this invention. Excellent results can be obtained without regard to whether the coated cheese is in fully frozen or partially frozen condition as used on the pizzas. The baked pizzas will have as good or better appearance when preapred by the method of this invention as those prepared from thawed and equilibrated cheese. Of course, the degree of browning of the cheese on the baked pizzas depends in part on the baking equipment and temperatures used. But on a comparative basis the pizzas prepared from the frozen granules will exhibit no more browning or blistering than pizzas prepared from fully thawed and equilibrated granules.

PROCESS EXAMPLES

Shredded mozzarella cheese is prepared in a granule size of about $\frac{1}{8} \times 3/16 \times \frac{3}{4}$ inches. The granules are subjected to IQF fluidized bed freezing in a "Flo-FREEZE" odel 300 WS-ADF supplied by Frigoscandia Contracting, Inc., Bellevue, Wash. The freezing and fluidizing air which is blown upwardly through the bed of granules can have a velocity of around 400 ft/min. and a temperature of about $-40°$ F. Frozen crusts form rapidly around the outside of the granules, viz. in one to two minutes or less. The time required for completion of the freezing is of the order of 7 minutes. The frozen granules leaving the fluidized bed have a temperature of around $-20°$ F. Weight loss due to moisture evaporation during the freezing process is less than 0.5%. Baffles along the sides and over the fluidized bed to minimize loss of cheese fines are provided. The frozen granules are packed in bags and boxed for storage, for example, at a temperature from $-10$ to $0°$ F.

Coatings for the frozen cheese can include one or more of the following flavor additives: lactose, glucose, diacetyl, free fatty acids (i.e., butyric, propionic, capric, caproic acids), cheese flavors (cheddar, Swiss, Provolone, etc.), meat flavors (bacone, pepperoni, sausage, etc.), spices (basil, oregano, garlic, dill, cinnamon, fennel, etc.), vegetable flavors (tomato, onion, pimiento, pepper, etc.), and fruit flavors (strawberry, pineapple, cherry, lemon, etc.). Functional cheese modifiers, such as emulsifier additives, may be used either alone or with the flavor additives, include: surfactants, disodium phosphate, sodium citrate, silicone emulsifiers, and other GRAS-approved modifiers.

The following formulations are illustrative.

Emulsifier Coating Solution

A silicone emulsifier (Dow Corning FG-10) is mixed with water to form a 0.05% emulsifier solution. This solution is sprayed on the frozen cheese granuels at a rate of 1.75 parts of solution per 100 parts by weight of cheese. This should achieve a final content of around 0.09% emulsifier on the cheese.

Provolone Flavoring of Mozzarella

A cheese having the flavor characteristics of provolone on cooking is prepared from mozzarella cheese as follows. Mozzarella cheese is first shredded or diced to a granular form, as previously described. For example, two different kinds of mozzarella cheese may be combined in equal parts by weight, such as 70% skim mozzarella and 30% low moisture mozzarella, to provide the granular cheese mixture which is subjected to rapid freezing as described above. After the granules are frozen, a series of two coatings is applied. The first comprises a 1% coating (based on the weight of the cheese granules) of an 0.85% solution of liquid smoke (Arrow P-50). After the first coating has been distributed in the form of a frozen layer around the cheese granules, a second coating is applied comprising a 1 to 1.5% application of an aqueous solution containing 2% defoamer and 1% sodium citrate dihydrate. A suitable defoamer is Union Carbide SAG 710 Food Grade, which is a silicone (dimethylpolysiloxane) emulsion.

Cheddar Flavoring of Mozzarella

A cheese having flavor characteristics similar to cheddar cheese on cooking is prepared from mozzarella cheese. In one embodiment, 100% part skim mozzarella cheese is converted to comminuted form. These granules after freezing are coated with two layers. The first layer comprises a 1 to 1.5% application of an aqueous solution containing 2% defoamer (Mazu) and 1% sodium citrate dihydrate. The same defoamer may be used as in the Provolone substitute. The second layer comprises a 2% application of a 50% solution of a cheddar cheese flavor including Annatto coloring. Suitable flavor ingredients include the following obtainable from H&R Corp., Springfield, N.J.: (1) R-9219, National Cheddar Cheese Flavor (Mild Type), and/or (2) R-9217, National Cheddar Cheese Flavor (Sharp Type).

The above solutions should be applied gradually while the frozen cheese granules are being mixed to distribute the solution over the outer surfaces of the granules. This produces thin frozen coatings around the outside of the granules while the granules remain in individual free-flowing condition. The silicone antifoamers tend to minimize blister formation and to increase oiling off in the baking of pizzas from the coated cheese granules.

Other Formulations

The formulations which may be used to modify the properties of the cheese granules during baking also include Formulations I to IV, as set out below. Aqueous solutions are prepared using the ingredients and concentrations shown. The solutions are applied to the cheese granules at the rate of two parts of solution per 100 parts by weight of the granules. Applications are preferably made after freezing of the granules, but solutions may also be applied at the same rate before freezing. With each of these formulations the granules exhibit a modified melt characteristic, the melting and fusing of the granules being promoted by the functional additive, such as sodium citrate, dimethylpolysiloxane, hexametaphosphate, and trisodium phosphate. Additional baked characteristics are noted below each formulation.

|  | Wt/Wt |
| --- | --- |
| I. Part Skim Mozzarella Cheese - Base | |
| Dimethylpolysiloxane (Defoamer) | 3.4 ppm |
| Sodium Citrate | 1735 ppm |
| Natural Butter Flavor | 101 ppm |
| Product is very tender, very fluid, and exhibits some oiling off. | |
| II. Part Skim Mozzarella Cheese - Base | |
| Sodium Citrate | 376 ppm |
| Natural Butter Flavor | 13 ppm |
| Product exhibits slight tenderness, and is somewhat more fluid upon cooking. | |
| III. Part Skim Mozzarella Cheese - Base | |
| Natural Butter Flavor | 225 ppm |
| Sodium Citrate | 700 ppm |
| Dimethylpolysiloxane | 1.7 |
| Product is tender, fluid, oily, and has very few blisters. | |
| IV. Part Skim Mozzarella Cheese - Base | |
| Hexametaphosphate | 8400 ppm |
| Trisodiumphosphate | 1900 ppm |
| Cheddar | 1930 ppm |
| Swiss | 1930 ppm |
| Smoked Provolone | 1930 ppm |
| This product is very fluid and tender. | |

This product is very fluid and tender.

In addition to commercial pizza preparations for sale in restaurants, the coated frozen cheese granules of the present invention are applicable to the home baking of pizzas sold in frozen condition. A manufacturer preparing pizzas for sale through retail outlets to home consumders can apply the coated frozen cheese granules to unbaked, unfrozen pizza, then without thawing the cheese the rest of the pizza is frozen by any suitable procedure. The unbaked frozen pizzas are distributed and sold in frozen condition. When a frozen pizza is purchased and baked at home without thawing, the advantages of this invention for baking the cheese in frozen or partially frozen condition will be obtained. By applying the frozen coated cheese granules to unbaked, unfrozen pizzas, a further advantage is provided. The frozen granules do not absorb the tomato or other liquid sauces. This protects the baking properties of the cheese granule against deterioration by absorption of an acidic sauce.

In still another application of the method of this invention, the coated comminuted frozen cheese may be packaged for sale to home users. As with commercial pizza manufacturers, the home user may apply the frozen or partially frozen cheese granules to pizza, and then bake the pizza without further holding. The coated frozen cheese granules may also be used as toppings on other food products which can be baked without thawing of the cheese. It should be understood that these alternative uses of the present invention are included within the scope of this application.

We claim:

1. In the method of preparing cheese granules and baking pizzas in which the granules are frozen and thereafter applied as a topping, wherein the improvement comprises: coating cheese granules consisting of at least one variety of mozzarella or a blend of mozzarella with other cheese with an aqueous carrier containing at least one cheese emulsifier effective for promoting the melting and fusing of the granules during baking, said coating comprising from about 0.5 to 4 parts by weight per 100 parts of uncoated granules and being distributed over the outer surfaces of the individual granules, the coated granules being in frozen free-flowing condition, applying the coated granules as a topping on pizzas being prepared for baking, and baking the pizzas to obtain melting and fusing of the granules.

2. In the method of preparing cheese granules and baking pizzas in which the granules are frozen and applied as a topping, wherein the improvement comprises: coating cheese granules consisting of at least one variety of mozzarella or a blend of mozzarella with other cheese in a cheese processing plant with an aqueous carrier containing at least one cheese emulsifier effective for promoting the melting and fusing of the granules during baking, said coating comprising from about 0.5 to 4 parts by weight by 100 part of uncoated granules and being distributed over the outer surfaces of the individual granules, storing the coated granules in frozen free-flowing condition, and thereafter in a retail pizza outlet or restaurant applying the granules as a topping on pizzas being prepared for baking, and baking the pizzas to obtain melting and fusing of the granules.

3. The method improvement of claims 1 or 2 in which said coating contains a plurality of cheese emulsifiers.

4. The method improvement of claims 1 or 2 in which said coating contains sodium citrate.

5. The method improvement of claims 1 or 2 in which said coating contains a dimethylpolysiloxane.

6. The method improvement of claims 1 or 2 in which said coating contains sodium citrate and a dimethylpolysiloxane.

7. The method of claim 2 in which said coating is applied to said granules after the granules are frozen.

8. The method of claim 2 in which said coating is applied to said granules before the granules are frozen.

* * * * *